United States Patent [19]

Shanley, II et al.

[11] 3,983,576
[45] Sept. 28, 1976

[54] APPARATUS FOR ACCENTUATING AMPLITUDE TRANSISTIONS

[75] Inventors: Robert Loren Shanley, II; James McIntire Yongue, both of Indianapolis, Ind.

[73] Assignee: RCA Corporation, New York, N.Y.

[22] Filed: May 23, 1975

[21] Appl. No.: 580,689

[52] U.S. Cl. .................................. 358/38; 358/37; 178/7.3 R; 178/DIG. 34
[51] Int. Cl.² ........................................... H04N 9/535
[58] Field of Search ..................... 358/37, 38, 13; 178/7.3 R, 7.5 R, DIG. 34; 333/70 T

[56] References Cited
UNITED STATES PATENTS

| | | | |
|---|---|---|---|
| 3,752,916 | 8/1973 | Lowry et al. | 178/7.5 R X |
| 3,778,543 | 12/1973 | Lowry | 358/37 |
| 3,780,215 | 12/1973 | Shibata et al. | 358/37 |
| 3,858,240 | 12/1974 | Golding et al. | 358/13 |

FOREIGN PATENTS OR APPLICATIONS

| | | | |
|---|---|---|---|
| 1,168,154 | 10/1969 | United Kingdom | 330/70 T |

Primary Examiner—Robert L. Griffin
Assistant Examiner—Aristotelis M. Psitos
Attorney, Agent, or Firm—Eugene M. Whitacre; Peter M. Emanuel

[57] ABSTRACT

A transversal equalizer is included in the luminance channel of a television receiver. Delayed video signals developed at taps of the transversal equalizer are combined to provide an output signal including preshoots and overshoots to accentuate amplitude transitions in the video signal so that, for example, a tonal transition from black to white is blacker than it normally would be just prior to the transition, and whiter than it normally would be just after the transition. The transversal equalizer includes provisions for selectively combining portions of predetermined delayed signals dependent upon the direction of the amplitude transitions such that preshoots and overshoots in one direction, e.g., the white direction, are relatively compressed or otherwise suppressed with respect to preshoots and overshoots in the other, i.e., black, direction.

11 Claims, 16 Drawing Figures

APPARATUS FOR ACCENTUATING AMPLITUDE TRANSISTIONS

This invention relates to apparatus for improving the transient response of television video signal processing systems, and particularly relates to improving the sharpness or crispness of the image generated by a television receiver.

It is known that the response of video processing systems may be subjectively improved by increasing the steepness of amplitude transitions in the video signals. The response may also be improved by the generation of a preshoot just before a transition and an overshoot just after the transition so that, for example, a transition from white to black will be accentuated because the image, just before the transition, is whiter than it is in the original scene and, just after the transition, is blacker than it is in the original scene.

Lumped parameter circuits are known for generating preshoots and overshoots to accentuate amplitude transitions in video signals. One such circuit is described in U.S. Pat. No. 3,780,215, issued to Shibata et al. on Dec. 18, 1973. In such lumped parameter circuits, unless special precautions are taken in selecting components to provide a substantially linear phase versus frequency transfer characteristic, the image may exhibit the presence of undesirable ringing and uncontrolled preshoots and overshoots which may be disconcerting to a viewer.

It is known that a controlled amplitude and/or phase versus frequency transfer characteristic may be formed by combining delayed signals generated at terminals (taps) of a delay line. Such apparatus, sometimes called "transversal equalizers" or "transversal filters", are generally described, for example, in U.S. Pat. No. 2,263,376 entitled "Electric Wave Filter, or the Like," issued to A. D. Blumlein et al., on Nov. 18, 1941; an article entitled "Transversal Filters," by H. E. Kallman, appearing in the *Proceedings of the I.R.E.*, Volume 28, Number 7,, pages 302–310, July 1940; an article entitled "Selectivity and Transient Response Synthesis," by R. W. Sonnenfeldt, appearing in *I.R.E. Transactions on Broadcast and Television Receivers*, Volume BTR-1, Number 3, pages 1–8, July 1955; and an article entitled "A Transversal Equalizer for Television Circuits," by R. V. Sperry and D. Surenian, appearing in *Bell System Technical Journal*, Volume 39, Number 2, pages 405–422, March 1960.

Transversal equalizers are useful in a variety of applications such as in horizontal and vertical aperture beam correction, as is described in U.S. Pat. No. 2,759,044, entitled "Beam Aperture Correction in Horizontal and Vertical Direction," issued to B. M. Oliver on Aug. 14, 1956.

In a co-pending U.S. patent application Ser. No. 486,241 entitled "Television Signal Processing Apparatus," by Joseph Peter Bingham, filed July 5, 1974, and assigned to the same assignee as the present invention, transversal equalizers useful in the luminance channel of a television signal processing system are described for accentuating the amplitudes of relatively high frequency components of the luminance portions of a video signal while attenuating the amplitudes of undesirable chrominance or sound portions of the video signal or both.

While it is desirable to provide preshoots and overshoots in video signals, care should be taken to avoid undesirable side effects due to excessively large preshoots and overshoots. For example, if a preshoot, in the case of a white to black transition, or an overshoot, in the case of a black to white transition, exceeds an acceptable limit, excessive beam current may be drawn in the image reproducer or picture tube with the result that blooming, i.e., blurring of white portions of the image, may occur. Under this condition, for example, small white letters in a black background may tend to appear as unrecognizable blurred white spots. Thus, it may be desirable to compress or otherwise suppress preshoots and overshoots in one direction, e.g., the white direction, relative to respective preshoots and overshoots in the other, e.g., black, direction.

It is also desirable to compress or otherwise suppress preshoots and overshoots in the white direction relative to preshoots and overshoots in the black direction to improve the reproduction of color images because an excessive preshoot or overshoot in the white direction associated with a transition in the image from one color to another color may, in effect, wash out (desaturate) one of the two colors near the transition.

In accordance with the present invention, means responsive to video signals are provided to accentuate relatively high frequency components of the video signals to produce an output signal having preshoots and overshoots to emphasize amplitude transitions. Means are coupled to the accentuating means for attenuating preshoots and overshoots in a predetermined, e.g., white, direction only.

In accordance with another feature of the present invention, signal delaying means, included in a television video processing system, are responsive to video signals. The signal delaying means includes a plurality of terminals for developing signals delayed by different amounts. Two of the delayed signals are combined to form a first combined signal. Means are provided for selectively combining, in accordance with the direction of the amplitude transitions, a portion of one of the two delayed signals with a least one delayed signal having a time delay between the time delays of the two delayed signals to derive a second combined signal. The second combined signal is combined with the first combined signal to derive an output signal having preshoots and overshoots which are relatively compressed or otherwise suppressed in one direction with respect to preshoots and overshoots in the other direction.

These and other aspects of the present invention will be best understood by the following detailed description in conjunction with the accompanying drawing in which.

Figure 1:
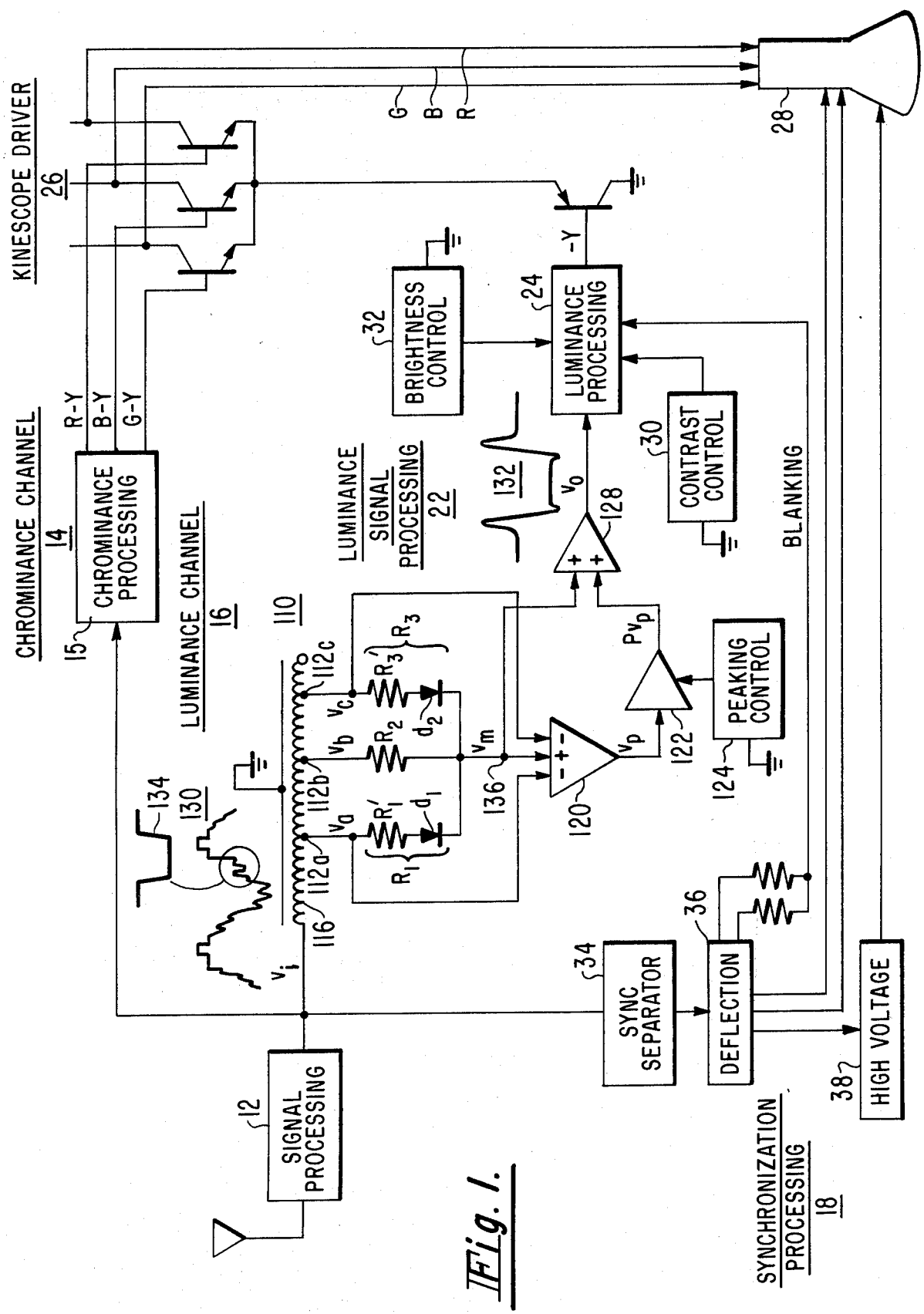
FIG. 1 shows, partially in block diagram form and partially in schematic form, the general arrangement of a color television receiver employing an apparatus constructed in accordance with the present invention.

In the drawing, reference designations appearing in more than one figure of the drawing refer to the same or similar items. Furthermore, similar components appearing in different figures may be constructed in the same manner.

Referring to FIG. 1, the illustrated color television receiver includes a signal processing unit 12 responsive to radio frequency (RF) television signals, received by an antenna, for generating, by means of intermediate frequency (IF) circuits (not shown) and detection circuits (not shown), a video signal comprising chrominance, luminance, sound and synchronization portions.

The composite video output signal of signal processing unit 12 is coupled to a chrominance channel 14 including a chrominance processing unit 15 which provides color difference signals representing, for example, R-Y, B-Y, and G-Y information. The color difference signals are coupled to one input of a kinescope driver 26.

The composite video signal is also coupled to a luminance channel 16 which includes a first luminance processing unit 22 and a second luminance processing unit 24. First luminance processing unit 22 serves to accentuate the amplitudes of relatively high frequency components of the luminance signals to generate a preshoot prior to an amplitude transition and an overshoot after an amplitude transition to emphasize tonal transitions in an image reproduced by a kinescope 28.

The output of first luminance processing unit 22 is coupled to second luminance processing unit 24 which, for example, contains an amplifier and a filter circuit to attenuate color or sound signals which may otherwise result in the formation of undesirable dots seen in an image reproduced by kinescope 28.

Further, a contrast control unit 30, which serves to control the amplitude of the luminance signals, and a brightness control unit 32, which serves to control the DC component of the luminance signals, are coupled to second luminance processing unit 24.

The amplified and processed luminance signals, $-Y$, are coupled to a second input of kinescope driver 26 where they are matrixed with color difference signals R–Y, B–Y and G–Y to produce R, B and G color signals of the appropriate polarity for application to kinescope 28.

The composite video signal is also coupled to a sync separator 34 which provides horizontal and vertical synchronization pulses to deflection circuits 36. Deflection circuits 36 and associated components are coupled to kinescope 28 and high voltage unit 38 to control the generation and deflection of the electron beam in kinescope 28. Deflection circuits 36 also generate blanking signals which are coupled to second luminance processing unit 24 to inhibit its output during the vertical and horizontal retrace periods.

The general circuit arrangement shown in FIG. 1 is suitable for use in a color television receiver of the type shown, for example, in *RCA Color Television Service Data*, 1973 No. C-8 (a CTC-68 type receiver), published by RCA Corporation, Indianapolis, Ind.

First luminance signal processing unit 22 includes a transversal filter comprising signal delaying means shown as a delay line 110, and a plurality of signal coupling means shown as successive terminals or taps 112a, 112b and 112c, coupled to delay line 110. The combination of delay line 110 and taps 112a, 112b and 112c is referred to hereinafter as a tapped delay line. The signal delaying means also may be formed in a different manner, for example, by an array of charge coupled devices (CCD's) or charge transfer devices. Furthermore, although taps 112a, 112b and 112c are shown as being directly connected to delay line 110, they may, for example, be capacitively coupled.

Taps 112a, 112b and 112c are coupled to delay line 110 at spaced intervals to develop respective delayed video signals $v_a$, $v_b$ and $v_c$ delayed in relation to an input signal $v_i$ by respective time intervals $T_D$, $T_D+T_1$ and $T_D+T_1+T_2$. A portion 116 of delay line 110 having the time delay $T_D$ is provided prior to tap 112a and is selected with respect to other portions of delay line 110 to equalize the time delays of the signals processed in luminance channel 16 and chrominance channel 14. For this purpose, it is desirable that the sum $T_D+T_1$ equal the difference between the time delays associated with signals processed in chrominance channel 16 and luminance channel 14.

Delayed signal $v_b$ is coupled to a summing junction 136 through a resistor $R_2$. Delayed signal $v_a$ is coupled to summing junction 136 through an impedance $R_1$ comprising a resistor $R_1'$ and a diode $d_1$. Diode $d_1$ is poled to conduct during positive-going signal transitions, i.e., transitions in the black direction. Delayed signal $v_c$ is coupled to summing junction 136 through an impedance $R_3$ comprising a resistor $R_3'$ and a diode $d_2$. Diode $d_2$ is poled to conduct during negative-going signal transitions, i.e., transitions in the white direction. Diodes $d_1$ and $d_2$ are desirably selected to have variable impedances dependent on the magnitude of the respective transitions during which they conduct. A signal $v_m$, formed at summing junction 136 is therefore formed by a portion of $v_b$ and either portions of $v_a$ or $v_c$ dependent on the direction and magnitude of the amplitude transitions.

Delayed signals $v_a$, $v_c$ and $v_m$ are also coupled to a summing circuit 120 which serves to algebraically subtract the sum of $v_a$ and $v_c$ from $v_m$ to produce a signal $v_p$. Summing circuit 120 may be formed by any suitable circuit for algebraically combining signals such as an operational amplifier or the like. Typically, $v_a$ and $v_c$ are algebraically added within summing circuit 120 prior to their subtraction from $v_m$. Summing circuit 120 may also include provisions for modifying the amplitude (i.e., weight) of $v_a$, $v_c$ and $v_m$ prior to their combination.

The output signal of summing circuit 120, $v_p$, is coupled to a variable gain device 122 which serves to modify the amplitude of $v_p$ to produce a signal $Pv_p$, where P is the gain (or attenuation) factor of variable gain device 122. Variable gain device 122, which, for example, may be formed by a variable gain amplifier, is arranged to produce a range of gains extending from values less than unity to values greater than unity in response to a control signal developed by a peaking control circuit 124. Peaking control circuit 124 may, for example, be formed of any suitable device for providing a control signal in response to manual adjustment. Alternatively, peaking control circuit 124 may also be arranged to derive a control signal from a portion of the composite video signal indicative of picture quality such as is described in co-pending U.S. pat. application Ser. No. 516,491, filed Oct. 21, 1974, by Joseph Peter Bingham and assigned to the same assignee as the present invention.

The signals $Pv_p$ and $v_m$ are coupled to a summing circuit 128. Summing circuit 128 is similar to summing circuit 120 and serves to algebraically add the signals $Pv_p$ and $v_m$ to produce the output signal $v_o$ of luminance signal processing unit 22.

The operation of signal processing unit 22 will be explained by way of example wherein $v_i$ is assumed to comprise a step transition in the black (positive) direction between normalized voltage levels of 0 and 1 and then a step transition in the white (negative) direction between normalized voltage levels of 0 and −1. Further by way of example, it will be assumed that the resistances of $R_1$ and $R_3$ are equal. That is, the resistance of $R_1'$ is selected equal to the resistance of $R_3'$ and diodes $d_1$ and $d_2$ are selected to exhibit substantially equal impedances in response to transitions of like magnitude. Further by way of example, it will be assumed that the resistance $R_1$ equals $3R_2$ and that summing means 120 weights (modifies the amplitudes of) $v_a$ and $v_c$ by a factor of ½ prior to their subtraction from $v_m$.

Figure 2A:
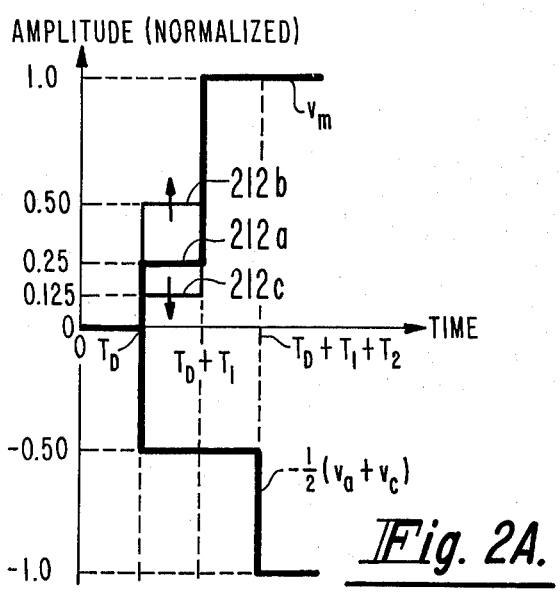
FIGS. 2A, 2B, 2C, 3A, 3B and 3C show graphical representations of time domain waveforms associated with the receiver shown in FIG. 1.

Referring to FIG. 2A, there is shown a graphical representation of the time domain waveform associated with circuit terminal 136 (signal $v_m$) when $v_i$ comprises a positive-going step from 0 to 1 (white to black transition). When the positive-going step of signal $v_i$ reaches tap 112a at time $T_D$, the voltage (1) at tap 112a will be greater than the voltge (0) at tap 112b, thereby causing diode $d_1$ to be conductive (forward biased). Since the voltage step has not yet reached taps 112b and 112c, diode $d_2$ will be back biased (non-conductive). Therefore, at time $T_D$, the signal $v_m$ will rise to a voltage level determined by the voltage division of resistance $R_1$ and $R_2$. The impedance of diode $d_1$, and therefore the resistance $R_1$, may be selected to be determined in part by the magnitude of the amplitude transition. Assuming that the magnitude of the amplitude transition is such that diode $d_1$ will exhibit an impedance corresponding to that at which the value of $R_1$ is the previously assumed nominal value, the signal $v_m$ will rise to a level 212a equal to 0.25. The illustrated signal levels 212b and 212c are shown to indicate that the amplitude of $v_m$ at time $T_D$ depends on the conduction of diode $d_1$. Level 212b corresponds to greater conduction than does level 212a while level 212c corresponds to lesser conduction.

The amplitude of the signal $v_m$ remains at a level 212a until the positive-going steps of signal $v_i$ reaches tap 112b +$T_1$. When the step reaches tap 112b, the voltage at tap 112b will be equal to the voltage at tap 112a but greater than the voltage at tap 112c. Therefore, each of diodes $d_1$ and $d_2$ will be non-conductive (back biased) causing the signal $v_m$ to rise to an amplitude of 1. The amplitude of $v_m$ will remain at 1 when the positive-going step reaches tap 112c at time $T_D$+$T_1$+$T_2$ since diodes $d_1$ and $d_2$ will remain backbiased.

In FIG. 2A there is also shown the graphical representation of the time domain waveform associated with −½($v_a$+$v_c$) formed within summing circuit 120. This waveform comprises a step to a level of −½ at time $T_D$ and another step to a level of −1 at a time of $T_D$+$T_1$+$T_2$.

Figure 2B:
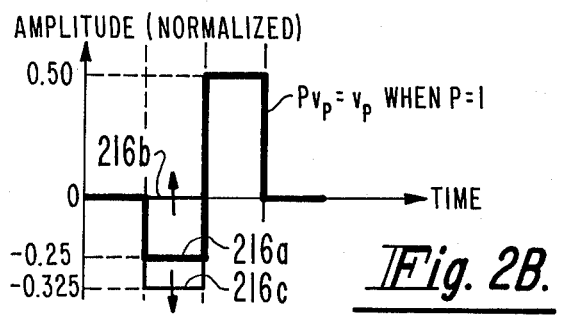

In FIG. 2B there is shown a graphical representation of the time domain waveform associated with $v_p$ formed at the output of summing circuit 120. It is noted that $v_p$ comprises a negative pulse portion and a positive pulse portion and that the negative pulse is smaller in amplitude than the positive pulse. The amplitude of the negative pulse is determined by the conduction of diode $d_1$. Therefore, level 216a corresponds to level 212a of FIG. 2A, level 216b corresponds to level 212b and level 216c corresponds to level 212c.

For purposes of this example, it will be assumed that the gain P of variable gain unit 122 is set to unity. Therefore, $v_p$ is equal to $Pv_p$.

Figure 2C:
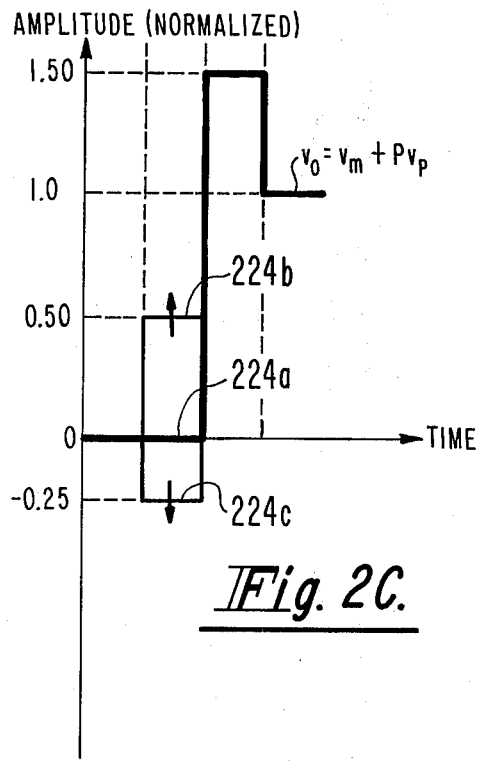

Referring to FIG. 2C, there is shown a graphical representation of the time domain waveform associated with $v_o$ formed by summing circuit 128. It is seen that $v_o$ has an overshoot whose amplitude is determined by the amplitude of the positive pulse of FIG. 2B and a preshoot whose amplitude is determined by the amplitude of the negative pulse of FIG. 2B. That is, level 224a relates to level 216a of FIG. 2B, level 224b relates to level 216b and level 224c relates to level 216c.

Thus, a preshoot in the white direction of a white-to-black transition is either compressed (224c) with respect to an overshoot in the black direction, cut off (224a), or, in essence, inverted (224b) to "smear" the amplitude transition depending on the magnitude of the amplitude transition, the conduction characteristics of diodes $d_1$, $d_2$ and the selection of $R_1'$, $R_2$ and $R_3'$. For example, if the incoming signal $v_i$ is expected to have a peak-to-peak (i.e., black to peak white) amplitude of the order of 1, it is desirable to select $d_1$ and $d_2$ as germanium diodes since the forward voltage of germanium diodes is typically 0.2 volt.

Figure 3A:
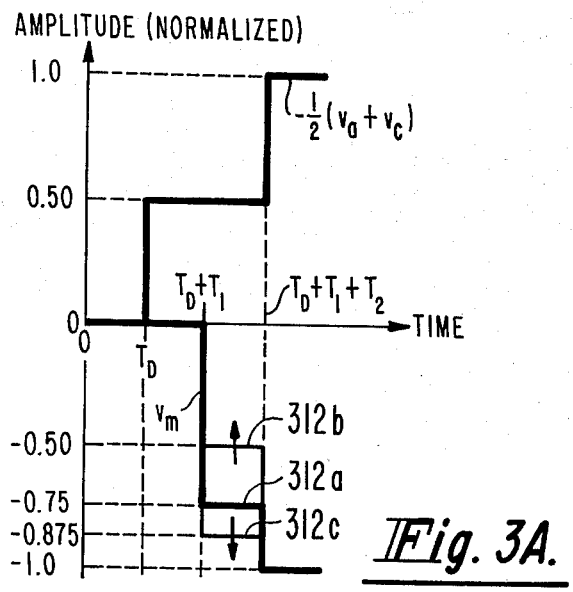

Referring now to FIG. 3A, there is shown a graphical representation of the time domain waveform associated with $v_m$ when $v_i$ comprises a negative-going step from 0 to −1, corresponding to a black-to-white transition. When the negative-going step of $v_i$ reaches tap 112a at time $T_D$, the voltage at tap 112a is less than the voltage at taps 112b and 112c, the latter two being at the same potential. Therefore, diodes $d_1$ and $d_2$ remain non-conductive. As a result, the signal $v_m$ at circuit point 136 remains at 0 until the negative-going step of $v_i$ reaches tap 112b at time $T_D$+$T_1$.

When the negative-going step of $v_i$ reaches tap 112b, the voltage at tap 112b is less than the voltage at tap 112c and diode $d_2$ will be conductive. However, diode $d_1$ remains non-conductive since the voltage at tap 112b is equal to the voltage at tap 112a. Therefore, at $T_D$+$T_1$, the signal $v_m$ will fall to a level depending upon the voltage division of $R_2$ and $R_3$. Assuming that the magnitude of the amplitude transition is such that diode $d_2$ conducts to a degree such that $R_3$ is at its nominal value, $v_m$ will fall to a level 312a, i.e., −0.75. Levels 312b and 312c indicate that level 312a changes dependent upon the conduction level of diode $d_2$. Level 312b corresponds to greater conduction of $d_2$ than does 312a, whereas level 312c corresponds to lower conduction of $d_2$ than does 312a.

The amplitude of $v_m$ remains at level 312a until time $T_D$+$T_1$+$T_2$ when the negative-going step of $v_i$ reaches tap 112c. At this time, diode $d_2$ is rendered non-conductive since the voltages at taps 112b and 112c are equal. Diode $d_1$ remains non-conductive since the voltage at taps 112a and 112b are equal. Therefore, the amplitude of $v_m$ falls to a level of −1.

Also shown in FIG. 3A is a graphical representation of the time domain waveform corresponding to the signal −½($v_a$+$v_c$) comprising a positive-going step to 0.5 at $T_D$ and another positive-going step to +1.0 at $T_D$+$T_1$+$T_2$.

Figure 3B:
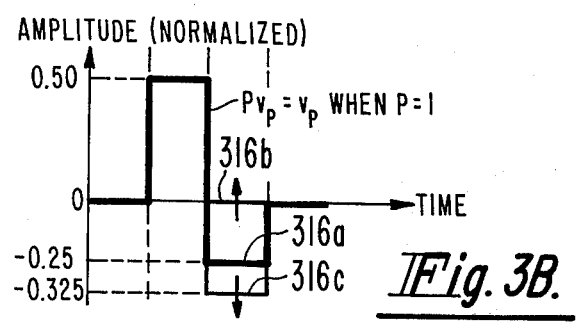

FIG. 3B is a graphical representation of the time domain waveform of $v_p$ formed by the addition of $v_m$ and −½($v_a$+$v_c$) in summing means 120 of FIG. 1. $v_p$ is formed by a positive-going pulse and a negative-going pulse. The amplitudes 316a, 316b and 316c of the negative-going pulse correspond to levels 312a, 312b and 312c of FIG. 3A. Assuming the value of P to be set at 1, $Pv_p$ equals $v_p$.

Figure 3C:
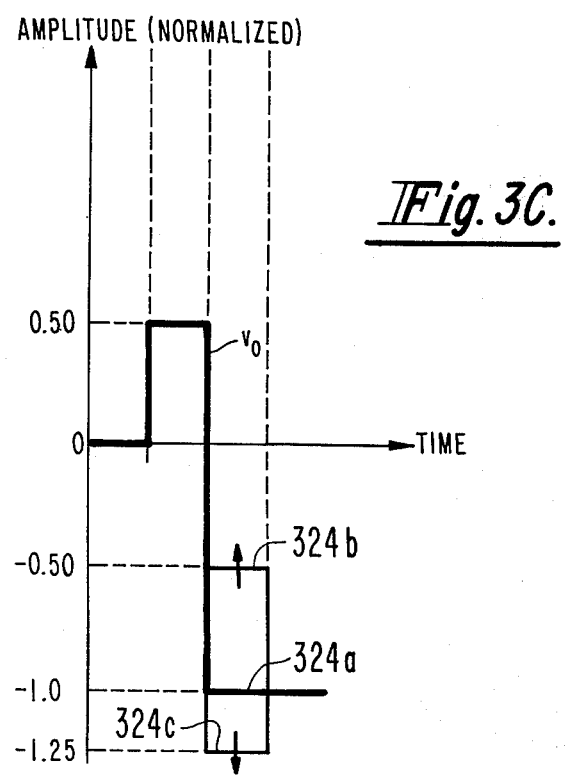

In FIG. 3C there is shown a graphical representation of time domain waveform corresponding to output signal $v_o$ when $v_i$ comprises a negative-going step from 0 to −1. It is noted that this waveform has a preshoot whose amplitude is determined by the amplitude of positive-going pulse of FIG. 3B and an overshoot whose amplitude is determined by the amplitude of the negative-going step of FIG. 3C. Level 324a corresponds to level 316a, level 324b corresponds to level 316b and level 324c corresponds to level 316c.

Thus, an overshoot in the white direction of a black-to-white transition is either compressed (324c) with respect to a preshoot in the black direction, cut-off (324a) or, in essence, inverted (324b) to smear the amplitude transition depending on the magnitude of the transition, the conduction of diode $d_2$, and the selection of $R_2$ and $R_3'$.

Thus, as was described above, first luminance processing unit 22 operates to compress or otherwise suppress preshoots and overshoots in one direction, i.e., the white direction, relative to preshoots and overshoots in the opposite direction, i.e., the black direction, to avoid spot defocussing and other undesirable results of excessive preshoots and overshoots. This function of luminance processing unit 22 is graphically demonstrated by input ($v_i$) waveforms 130 and 134 and output waveform ($v_o$) 132. The blown-up portion 134 of waveform 130 represents a transition in the white direction and then a transition in the black direction, the positive direction corresponding to the black direction. It is noted that in waveform 132, corresponding to the processed form of waveform 134, the preshoots and overshoots in the white direction are compressed relative to the preshoots and overshoots in the black direction.

The amplitude versus frequency transfer characteristics associated with luminance signal processing unit 22 of FIG. 1 will be explained by way of an example where taps 112a and 112c are symmetrically located about tap 112b such that time delay $T_1$ and $T_2$ are equal to a time delay of ($1/f$), where $f$ is the frequency of a signal component of the input signal $v_i$, such as a chrominance or sound signal subcarrier, which may undesirably be present in luminance channel 16 of FIG. 1. Further, by way of example, summing circuit 120 is arranged to weight the signals $v_a$, $v_m$ and $v_c$ by respective weights of ½, 1 and ½ prior to their combination.

In general, it is desirable to space delayed signals $v_a$ and $v_c$ apart in time by an interval (NT/2), where N is an integer and T is the reciprocal of the frequency $f$. The preferred range of N includes integers between 2 and 5.

Figure 4:
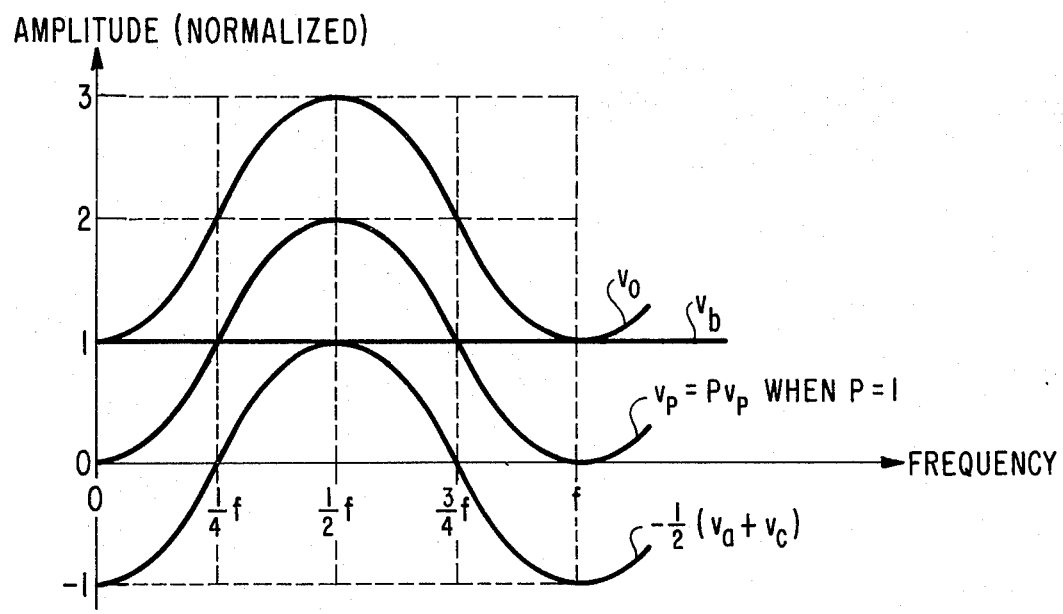
FIG. 4 shows graphical representation of frequency domain waveforms associated with the receiver shown in FIG. 1.

Referring to FIG. 4, assuming that neither diode $d_1$ or $d_2$ conduct, the normalized amplitude versus frequency transfer characteristic associated with the summing point 136 ($v_m$) is, by definition, flat. The characteristics associated with the signal −½($v_a+v_c$), formed within summing circuit 120, is a cosine function having a maximum amplitude at ½$f$ and a minimum at $f$. Since $v_p$ is formed by algebraically adding $v_m$ and −½($v_a+v_c$), the characteristic associated with $v_p$ is also a cosine function with a maximum amplitude at ½$f$ and a minimum at $f$. If P has a value of 1, $Pv_p$ equals $v_p$. Since $v_o$ is formed by the algebraic addition of $v_m$ and $Pv_p$, the characteristic associated with $v_o$ is a cosine function having a maximum amplitude at ½$f$ and a minimum amplitude at $f$. Thus, the time delay between $v_a$ and $v_c$ may be selected to accentuate signals having frequencies in the vicinity of ½$f$ or to attenuate signals having frequencies in the vicinity of $f$.

Assuming $f$ were chosen as the frequency of the color subcarrier, e.g., 3.58 MHz, chrominance signals in the vicinity of the color subcarrier will be relatively attenuated. Furthermore, luminance signals in the vicinity of 1.8 MHz will be relatively accentuated or peaked. As a result, assuming neither diode $d_1$ or $d_2$ of luminance signal processing unit 22 of FIG. 1 is rendered conductive, preshoots and overshoots will be generated in both the black and white directions to emphasize amplitude transitions. However, in actual operation, certain portions of $v_a$ and $v_c$ are selectively combined with $v_b$ to form $v_m$ because of the respective conduction of diode $d_1$ or $d_2$. Thus, the characteristic of the signal $v_o$ is modified such that the peaking of luminance signals in the vicinity of ½$f$ is effectively reduced for transitions in the white direction relative to the peaking for transitions in the black directions.

Since the amplitude of the characteristic associated with the signal $v_o$ at 3.58 MHz is 1 in the illustrated example, it may be desirable to provide additional circuitry, such as a color subcarrier trap or the like, to further attenuate chrominance signals. Furthermore, in some applications, it may be desirable to provide peaking of luminance signals at a higher frequency than 1.8 MHz. In that case, the embodiment of FIG. 5, which may be arranged to provide peaking of relatively higher frequency components of luminance signals consistent with effective filtering of undesirable signals, such as signals in the vicinity of the color or sound subcarrier, may be employed.

Figure 5:
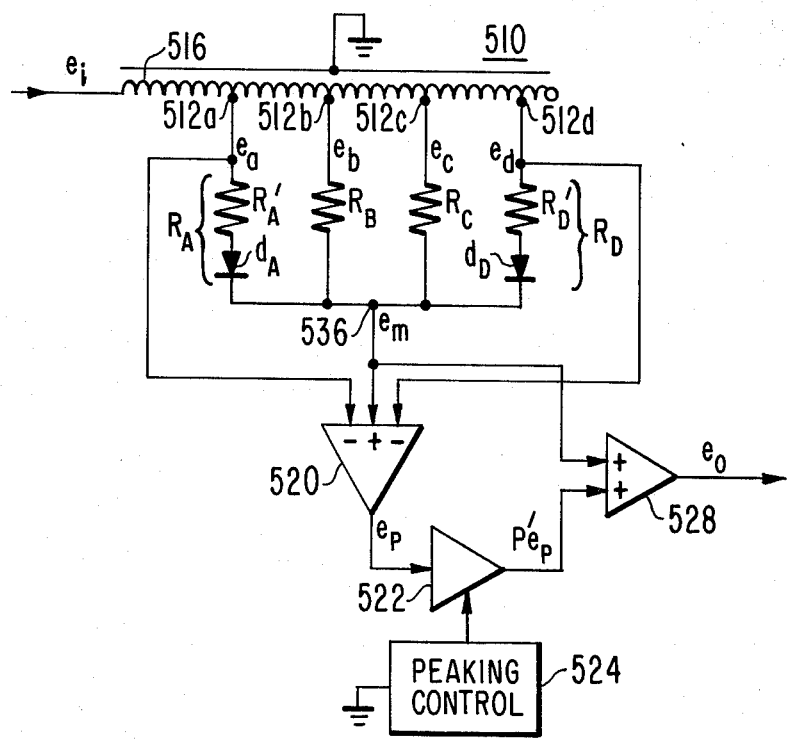
FIG. 5 shows another embodiment of the present invention useful in the receiver shown in FIG. 1.

The luminance signal processing unit of FIG. 5 includes a delay line 510, having a plurality of terminals (taps) 512a, 512b, 512c and 512d to develop respective delayed video signals $e_a$, $e_b$, $e_c$ and $e_d$ delayed in relation to an input $e_i$ by respective time intervals D, D+$D_1$, D+$D_1$+$D_2$, and D+$D_1$+$D_2$+$D_3$. The time delay D is provided prior to tap 512a to equalize the time delays of the signals in the luminance and chrominance channels.

A signal summing junction 536 is coupled to tap 512a via an impedance $R_A$ comprising resistor $R_A'$ and diode $d_A$, to tap 512b via a resistor $R_B$, to tap 512c via a resistor $R_C$ and to tap 512d via an impedance $R_D$ comprising a resistor $R_D'$ and a diode $d_D$. Diode $d_A$ is poled to conduct for positive-going (i.e., black-going) signal transitions while diode $d_D$ is poled to conduct for negative-going (white-going) transitions. Thus, the signal $e_m$ formed at summing junction 536 includes portions of $e_b$ and $e_c$ and either $e_a$ or $e_d$, depending on the direction of the amplitude transition.

Signals $e_a$, $e_d$ and $e_m$ are coupled to a summing circuit 520 which subtracts the sum ($e_a+e_d$) from $e_m$ to form a signal $e_p$. Summing circuit 520 may also include provisions for modifying the amplitudes of $e_a$, $e_d$ and $e_m$ prior to their combination.

The output signal of summing circuit 520, $e_p$, is coupled to variable gain device 522 which produces a signal P'$e_p$ where P' is the gain (or attenuation) factor of device 522. Device 522 produces a range of gains from less than unity to greater than unity in response to a control signal developed by peaking control circuit 524.

The output of variable gain device 522, $P'v_p$, is coupled to summing circuit 528 where is is algebraically added with $e_m$ to produce an output signal $e_o$.

The operation of the embodiment of FIG. 5 will be described where taps 512a, 512b, 512c and 512d are symmetrically located about a point midway between taps 512a and 512d and time delays $D_1$, $D_2$ and $D_3$ are equal. Further, it will be assumed that the values of resistors $R_B$ and $R_C$ are equal, that the nominal values of impedances $R_A$ and $R_D$, when diodes $d_A$ and $d_D$ are conductive, are equal to $(3/2)R_B$, and that summing circuit 520 modifies the amplitudes of $e_a$ and $e_d$ by weights of ½ prior to their subtraction from $e_m$.

Figure 6A:
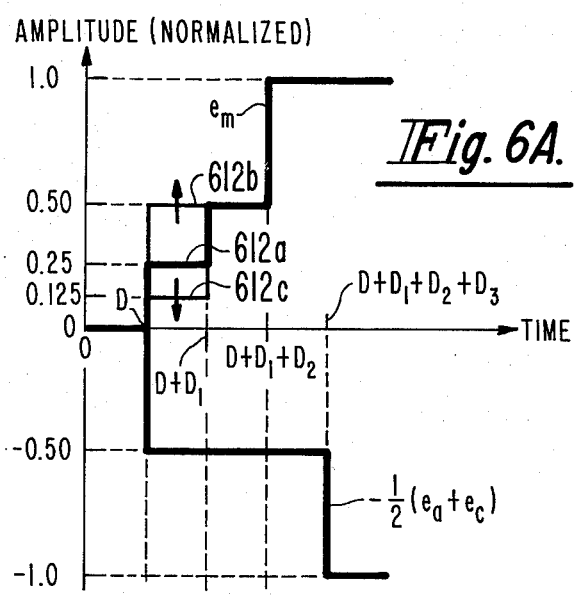
FIGS. 6A, 6B, 6C, 7A, 7B and 7C show graphical representations of time domain waveforms associated with the embodiment shown in FIG. 5.

The responses of the signal processing unit of FIG. 5 to a positive-going step from 0 to 1 and then from a negative-going step from 0 to −1 will be explained separately. Referring to FIG. 6A, when $e_i$, comprising a positive-going step from 0 to 1 reaches tap 512a at time D, diode $d_A$ will be rendered conductive since the voltge at tap 512a will be greater than the voltage at taps 512b, 512c and 512d. Diode $d_D$ will not be rendered conductive since the voltage at tap 512d will be less than or equal to the voltage at taps 512a, 512b and 512c. Therefore, $e_m$ will rise to a level 612a determined by the voltage division action of impedance $R_A$ and the parallel combination of resistors $R_B$ and $R_C$. Assuming that the magnitude of $e_i$ is such that diode $d_A$ is conductive to the degree at which $R_A$ is nominal, $e_m$ will rise to a normalized level of 0.25. Levels 612b and 612c correspond to greater and lesser degrees of conduction of diode $d_A$ in accordance with, respectively, greater or lesser magnitudes of $e_i$.

When the positive-going step of a $e_i$ reaches tap 512b, neither diode $d_A$ nor $d_D$ will conduct since the voltage at tap 512a is equal to the voltage at tap 512b and the voltage at tap 512d is less than or equal to the voltage at taps 512a, 512b, and 512c. Therefore, at time $D+D_1$, $e_m$ will rise to a level (in this example, +0.5) dependent upon the voltage division of $R_B$ and $R_C$.

When the positive-going step $e_i$ reaches tap 512c, neither diode $d_A$ or $d_D$ will conduct since the voltage at tap 512d is less than the voltage at taps 512a, 512b and 512c and the voltage at tap 512a is equal to the voltage at taps 512b and 512c. Since, at this time $(D+D_1+D_2)$, the voltages at taps 512b and 512c are both at the same potential, i.e., 1, $e_m$ will rise to 1.

When the positve-going step $e_i$ reaches tap 512d at time $D+D_1+D_2+D_3$, diodes $d_A$ and $d_D$ will remain nonconductive since the voltages at all of the taps are equal and therefore $e_m$ remains at 1.

Also shown in FIG. 6A is a graphical representation of the time domain waveform corresponding to the signal $-½(e_a+e_d)$ formed within summing circuit 520 of FIG. 5 prior to combination with $e_m$. It is seen that $-½(e_a+e_d)$ is formed by a negative-going step to −0.5 at time D and another negative-going step to −1 at time $D+D_1+D_2+D_3'$.

Figure 6B:
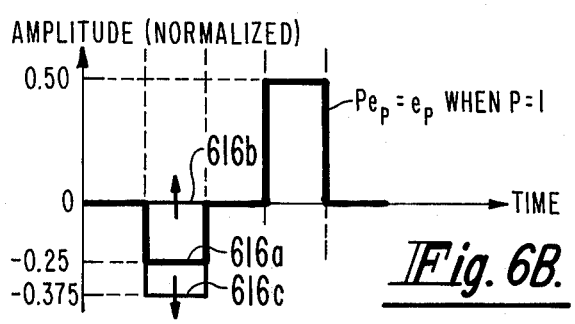

FIG. 6B shows a graphical representation of the time domain waveform corresponding to the signal $e_p$ formed by the addition of $e_m$ and $-½(e_a+e_d)$. It is seen that $e_p$ comprises a positive-going pulse and a negative-going pulse. The amplitudes 616a, 616b and 616c of the negative-going pulse correspond to the levels 612a, 612b and 612c of $e_m$ of FIG. 6A. Assuming that $p'$ is selected as 1, $P'e_p$ equals $e_p$.

Figure 6C:
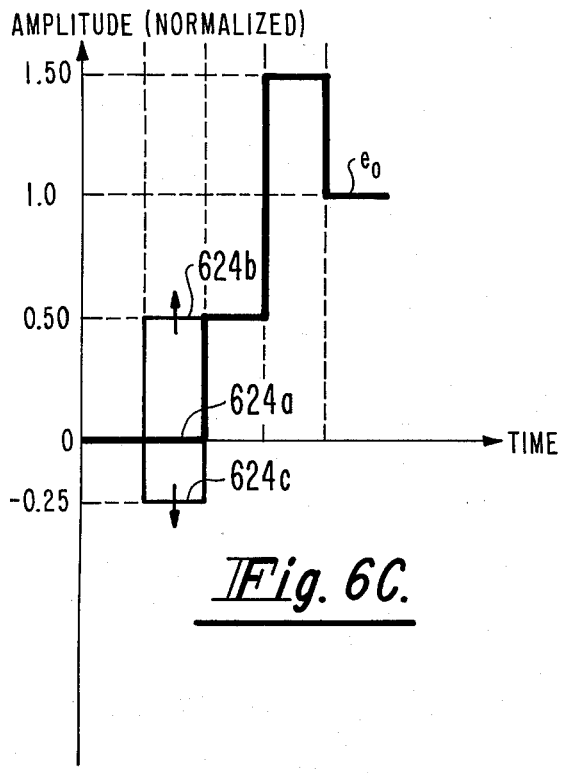

FIG. 6C shows a graphical representation of the time domain waveforms of $e_o$. The output signal $e_o$ has an overshoot of constant amplitude and a preshoot whose amplitude is either compressed (624c) with respect to the amplitude of the overshoot, eliminated (624a) or, in essence, inverted (624b). Level 624a corresponds to level 616a of $P'e_p$ of FIG. 6B while level 624b corresponds to level 616b and level 624c corresponds to level 616c.

Figure 7A:
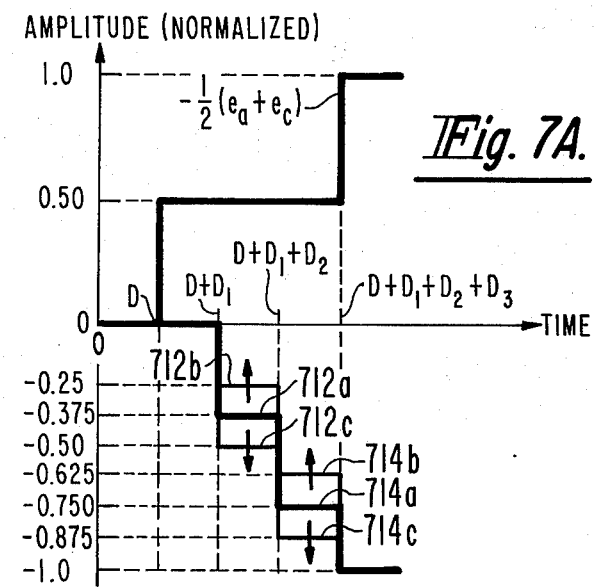

Referring to FIG. 7A, there is shown a graphical representation of the time domain waveform associated with $e_m$ when $e_i$ comprises a negative-going step from 0 to −1. When the negative-going step of $e_i$ reaches tap 512a, diode $d_A$ remains non-conductive since the voltage at tap 512a is less than the voltage at taps 512b, 512c and 512d. Therefore, the amplitude of $e_m$ between times D and $D+D_1$ is equal to 0.

When the negative-going step $e_i$ reaches tap 512b, diode $d_A$ remains non-conductive while diode $d_D$ is rendered conductive since the voltage at tap 512b is equal to the voltage at tap 512a but is less than the voltages at taps 512c and 512d. Therefore, $e_m$ will fall to a level 712a, 712b or 712c dependent upon the voltage division action of the resistive divider comprising resistor $R_B$ in series with the parallel combination of resistor $R_C$ and impedance $R_D$. The levels 712a, 712b and 712c correspond to the various degrees of conduction of diode $d_D$ dependent upon the magnitude of $e_i$ relative to the conductive characteristics of diode $d_D$.

When the negative-going step $e_i$ reaches tap 512c, diode $d_A$ remains non-conductive since the voltage at tap 512a is less than or equal to the voltage at taps 512b, 512c and 512d, and diode $d_D$ remains conductive since the voltage at tap 512d is greater than the voltage at taps 512a, 512b and 512c. Therefore, $e_m$ falls to level 714a, 714b or 714c dependent upon the voltage division action of the voltage divider comprising resistor $R_D$ in series with the parallel combination of resistor $R_C$ and impedance $R_B$. The levels 714a, 714b and 714c correspond to the changes in conduction of $D_D$ dependent upon the magnitude of $e_i$ in relation to the conduction characteristics of diode $d_D$.

Also shown in FIG. 7A is a graphical representation of the time domain waveform corresponding to the signal $-½(e_a+e_d)$ formed within summing circuit 520 of FIG. 5 prior to substraction. It is seen that $-½(e_a+e_d)$ is formed by a positive-going step to 0.5 at time D and another positive-going step to +1 at time $D+D_1+D_2+D_3$.

Figure 7B:
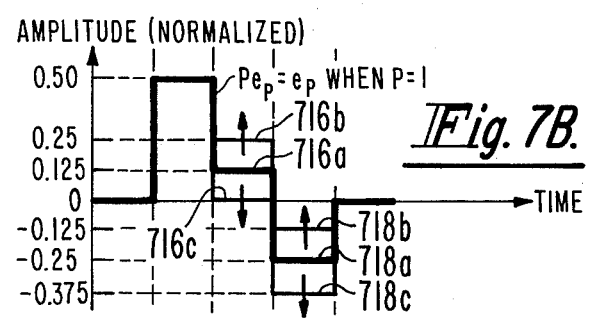

In FIG. 7B there is shown a graphical representation of the time domain waveform associated with $e_p$ formed by the addition of $e_m$ and $-½(e_a+e_d)$. Assuming that $P'$ is selected to equal 1, $P'e_p$ equals $e_p$. It is noted that the waveform of $P'e_p$ includes a positive pulse of constant amplitude, a positive-going pulse of variable amplitude and a negative pulse of variable amplitude. The amplitudes 716a, 716b and 716c of the variable amplitude positive pulse reprectively correspond to levels 712a, 712b and 712c of $e_m$ of FIG. 7A. The amplitudes 718a, 718b and 718c of the variable amplitude negative pulse corresponds to levels 714a, 714b and 714c of $e_m$ of FIG. 7A.

Figure 7C:
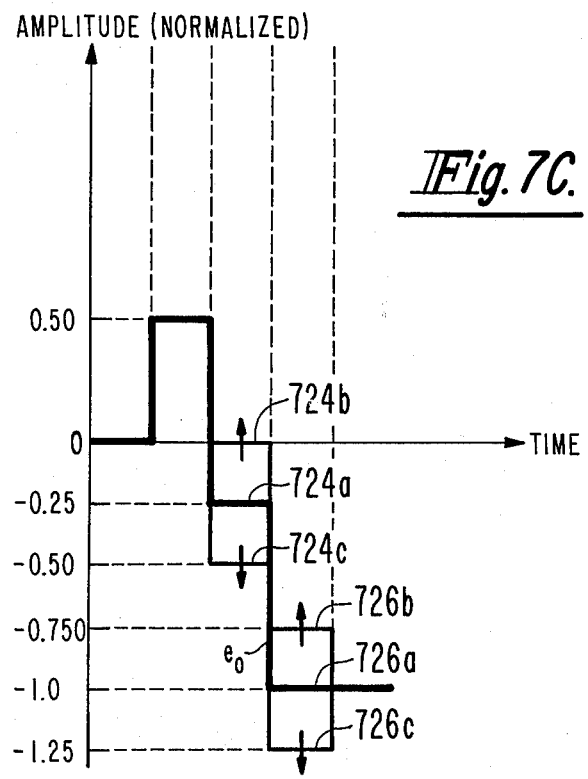

In FIG. 7C there is shown a graphical representation of the time domain waveform associated with $e_o$. It is noted that $e_o$ has a preshoot of constant amplitude and an overshoot whose amplitudes 726a, 726b and 726c depend respectively on the amplitudes 718a, 718b and 718c of FIG. 7B. It is noted that the amplitude of the overshoot is either compressed (726c) with respect to the amplitude of the preshoot, eliminated (726a) or, in essence, inverted (724a) dependent upon the degree of conduction of diode $d_D$. It is also noted that the rise time of $e_o$ from 0 to $-1$ is, in essence, smeared by the presence of levels 724a, 724b or 724c. The levels 724a, 724b and 724c respectively correspond to levels 716a, 716b and 716c of FIG. 7B.

The amplitude versus frequency transfer characteristics associated with the signal processing unit of FIG. 5 will be explained by way of example wherein it is assumed that taps 512a, 512b, 512c and 512d are symmetrically located around the point of delay line 510 midway between taps 512a and 512d and that the time intervals $D_1$, $D_2$ and $D_3$ each are equal to $(1/2f')$ where $f'$ is the frequency of a signal component of $e_i$ which may be undesirably present in luminance channel 16 of FIG. 1. For instance, $f'$ may be the frequency of a signal in the range of frequencies containing the chrominance or sound subcarriers or both. More specifically, $f'$ may be the color subcarrier frequency, e.g., 3.58 MHz, or the sound intercarrier frequency, e.g., 4.5 MHz. Further, by way of example, it is assumed that summing circuit 520 is arranged to modify the amplitudes of delayed signals $e_a$ and $e_d$ by a weight of ½ prior to their combination with $e_m$.

In general, it is desirable to space delayed signals a and d apart in time by a predetermined interval ($N'\lambda T'/2$), where $N'$ is an interger and $T'$ is the reciprocal of the frequency $f'$. The preferred range of $N'$ includes integers between 2 and 5.

Figure 8:
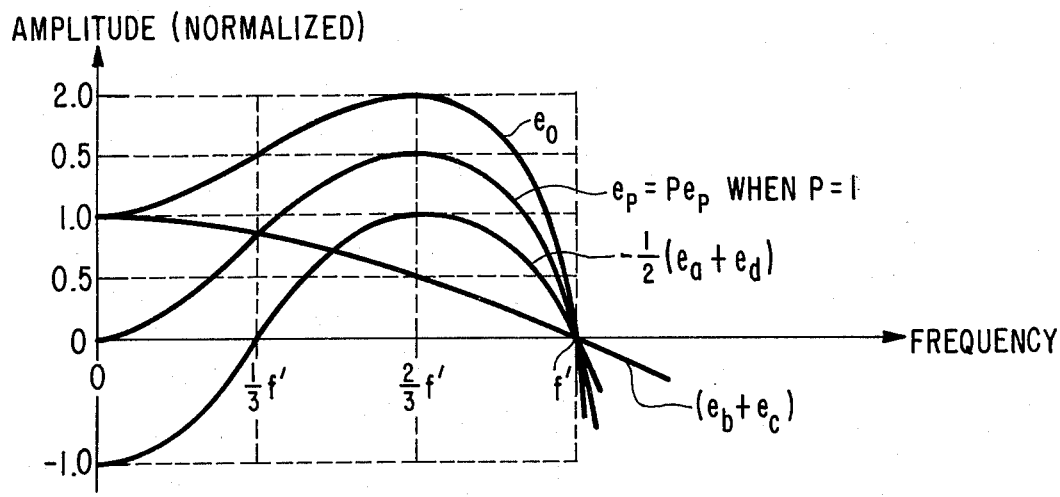
FIG. 8 shows graphical representations of frequency domain waveforms associated with the embodiment shown in FIG. 5.

Referring to FIG. 8, there are shown graphical representations of the amplitude versus frequency transfer characteristics associated with the signals $-½(e_a+e_d)$, $(e_b+e_c)$, $e_p'P'e_p$ and $e_o$ assuming that neither diode $d_A$ or $d_D$ are conducting. The transfer characteristic associated with $(e_b+e_c)$ is a cosine function having a recurrence rate of $4f'$ while the transfer characteristic associated with $-½(e_a+e_d)$ is a cosine function having a recurrence rate of $(4/3)f'$.

The transfer characteristic associated with $e_p$ is relatively narrowband having an amplitude equal to zero at DC and $f'$ and having a peak amplitude at $2/3f'$. The location of the peak amplitude of the transfer characteristic associated with $e_p$ is determined by the time delay between delay signals $e_a$ and $e_d$. Assuming that the value of $P'$ is selected equal to 1, $e_p$ equals $P'e_p$. The transfer characteristic associated with $e_o$ is relatively accentuated or peaked at $2/3f'$ and relatively attenuated at $f'$.

Thus, assuming that neither diode $d_A$ or $d_D$ conducts and that $f'$ is chosen as the frequency of the color subcarrier, e.g., 3.58 MHz, chrominance signals in the vicinity of 3.58 MHz will be relatively attenuated. Furthermore, luminance signals in the vicinity of 2/3(3.58) MHz will be relatively accentuated. As a result, preshoots and overshoots in both the black and white directions will be generated to accentuate amplitude transitions. However, since, in the actual operation of the luminance signal processing unit of FIG. 5, portions of $e_a$ and $e_d$ are selectively combined by virtue of the conduction of diodes $d_A$ and $d_D$, respectively, with portions of $e_b$ and $e_c$ to form $e_m$, the characteristic of $e_o$ is modified such that peaking of luminance signals in the vicinity of $2/3f'$ is, in essence, reduced for transitions in the white direction relative to the peaking for transitions in the black direction.

It should be noted that although the luminance signal processing units of FIGS. 1 and 5 have been arranged to compress or otherwise suppress preshoots in the white direction relative to preshoots and overshoots in the black direction, the units may be modified to compress or otherwise suppress preshoots and overshoots in the black direction relative to preshoots and overshoots in the white direction. Further, it should be appreciated that although delay line 110 of FIG. 1 and delay line 510 of FIG. 5 will be shown as being terminated by an open circuit, the delay lines may be terminated in their characteristic impedances to minimize reflections from the end of the lines. It should also be appreciated that summing circuit 120 of FIG. 1 and summing circuit 520 of FIG. 5 desirably have input impedances sufficiently high so as not to affect the formation of $v_m$ and $e_m$ respectively. It should be appreciated that these and other modifications are intended to be within the scope of the present invention.

What is claimed is:

1. Apparatus comprising:
 a source of video signals, said video signals including amplitude transitions;
 signal delaying means coupled to said source having a plurality of terminals for developing a plurality of video signals delay by different amounts;
 means for combining two of said delayed signals which are delayed in time from one another by a predetermined time interval to derive a first combined signal;
 means for selectively combining a portion of one of said two delayed signals dependent upon the direction of said amplitude transitions with a portion of at least one other of said delayed signals, said other signal have a time delay intermediate the time delays of said two delayed signals, to derive a second combined signal; and
 means for combining said first and second combined signals to derive an output signal.

2. The apparatus recited in claim 1 wherein said predetermined time interval is substantially equal to $(NT/2)$, where T is the period of a signal component of said video signal and N is an integer.

3. The apparatus recited in claim 2 wherein said means for deriving said first combined signal provides the sum of said two delayed signals.

4. The apparatus recited in claim 3 wherein said means for deriving said output signal includes means for subtracting said first combined signal from said second combined signal to derive a third combined signal.

5. The apparatus recited in claim 4 wherein said means for deriving said output signal includes means for adding said third combined signal and said second combined signal to derive said output signal.

6. The apparatus recited in claim 5 wherein said means for deriving said output signal includes means for controlling the amplitude of said third combined signal.

7. The apparatus recited in claim 1 wherein said means for deriving said second combined signal comprises:
 a circuit point;
 means for directly coupling said one delayed signal to said circuit point;
 means including a first unidirectional coupling device, for unidirectionally coupling a first of said two delayed signals to said circuit point; and
 means, including a second unidirectional device, for unidirectionally coupling the second of said two delayed signals to said circuit point, said first and second unidirectional coupling devices being poled to conduct in the same sense with respect to said circuit point.

8. The apparatus recited in claim 7 wherein the degree of conduction of said first and second unidirectional conduction devices is dependent upon the magnitude of said amplitude transitions.

9. The apparatus recited in claim 8 wherein said first unidirectional coupling device is poled to conduct for amplitude transitions of said video signal corresponding to transitions from a dark tone to a whiter tone in an image reproduced in accordance with said video signal.

10. The apparatus recited in claim 1 wherein the portion of said one of said two delayed signals combined with the portion of said other delayed signal having a time delay between the time delays of said two delayed signals to derive said second combined signal is determined by the magnitude of said amplitude transition.

11. The apparatus recited in claim 1 wherein said video signals include luminance signals and chrominance signals and wherein said signal delaying means includes a portion for equalizing the time delays of the chrominance and luminance signals.

* * * * *

UNITED STATES PATENT OFFICE
CERTIFICATE OF CORRECTION

PATENT NO. : 3,983,576
DATED : September 28, 1976
INVENTOR(S) : Robert Loren Shanley, II, et al.

It is certified that error appears in the above-identified patent and that said Letters Patent are hereby corrected as shown below:

In the Title, the word "TRANSISTIONS" should read -- TRANSITIONS --.

Column 6, line 24, the portion reading "the order of 1," should read -- the order of 1 volt, --.

Column 9, line 20, the portion reading "voltge at tap 512a" should read -- voltage at tap 512a --.

Column 11, lines 25-26, the expression reading "(N'$\lambda$T'/2)," should read -- (N'T'/2), --.

Signed and Sealed this twelfth Day of July 1977

[SEAL]

Attest:

RUTH C. MASON
Attesting Officer

C. MARSHALL DANN
Commissioner of Patents and Trademarks